United States Patent
Peng et al.

(10) Patent No.: US 6,792,044 B2
(45) Date of Patent: Sep. 14, 2004

(54) METHOD OF AND SYSTEM FOR ACTIVITY-BASED FREQUENCY WEIGHTING FOR FGS ENHANCEMENT LAYERS

(75) Inventors: Shaomin Peng, Yorktown Heights, NY (US); Minacia van der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 741 days.

(21) Appl. No.: 09/859,781

(22) Filed: May 16, 2001

(65) Prior Publication Data

US 2002/0172279 A1 Nov. 21, 2002

(51) Int. Cl.[7] ................................................ H04N 7/12
(52) U.S. Cl. ................................................ 375/240.03
(58) Field of Search .................... 348/398.1, 397.1, 348/438.1; 375/240.03, 240.01, 240.19, 240.15, 240.25, 240.16; 382/240, 248

(56) References Cited

U.S. PATENT DOCUMENTS

| | | | |
|---|---|---|---|
| 6,057,884 A | 5/2000 | Chen et al. | |
| 6,092,107 A | 7/2000 | Eleftheriadis et al. | |
| 6,173,087 B1 | 1/2001 | Kumar et al. | |
| 6,661,841 B2 * | 12/2003 | Radha et al. | 375/240.1 |
| 6,700,933 B1 * | 3/2004 | Wu et al. | 375/240.16 |
| 2002/0034248 A1 * | 9/2000 | Chen | 375/240.08 |

* cited by examiner

*Primary Examiner*—Chris Kelley
*Assistant Examiner*—Behrooz Senfi
(74) *Attorney, Agent, or Firm*—John Vodopia

(57) ABSTRACT

The present invention provides methods and systems to determine the frequency weighting matrix that will provide the best image quality during MPEG4 FGS enhancement layer encoding, and to change this determination on a scene characteristics change basis, thereby optimizing the resulting output picture quality, especially in bandwidth-deprived applications.

6 Claims, 3 Drawing Sheets

METHOD OF AND SYSTEM FOR ACTIVITY-BASED FREQUENCY WEIGHTING FOR FGS ENHANCEMENT LAYERS

FIELD OF THE INVENTION

The present invention relates to methods of and systems for processing video during compression, specifically MPEG-4 video compression, wherein enhancement layers are added to the base layer using activity-based frequency weighting methods in an adaptive procedure, to allow a more visually-sensitive component of a video frame to be encoded in a high priority of number of bit-planes, and thus to provide high visual quality at decompression time

BACKGROUND OF THE INVENTION

"MPEG" generally represents an evolving set of standards for video and audio compression developed by the Moving Picture Experts Group. The need for compression of motion video for digital transmission becomes apparent with even a cursory look at uncompressed-bitrates in contrast with bandwidths available. MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems. MPEG-4 is designed for very low-bit rate applications, using a more flexible coding standard to target internet video transmission and the wireless communications market.

The MPEG4 video compression standard allows content-based access or transmission of an arbitrarily-shaped video object plane (VOP) at various temporal and spatial resolutions. MPEG4 supports both object and quality scalability. The fine granularity scalability ("FGS") is one type of scalable coding scheme that is adopted by the MPEG4 standard. The FGS encoding scheme allows an MPEG4 bitstream to be encoded in two layers: the base layer, which encodes each frame with a fixed lower bound bit-rate; and the enhancement layer, which encodes the difference between original picture and the reconstructed base-layer picture. The enhancement layer is encoded via a bitplane coding scheme, therefore enhancement layer bitstrearms are scalable in the sense that an arbitrary (fine grained) number of bit-planes of the enhancement-layer can be transmitted to the decoder depending on the transmission bandwidth. The FGS coding scheme has been finalized by MPEG4 version 4.

In the standardized FGS scheme, frequency weighting is a feature used for visual quality improvement. By giving different weights to the elements of each coding block, the enhancement layer residuals are weighted and encoded relative to their importance to the visual output quality.

The MPEG-4 decoder may decode only the base layer or the base layer and any subset of the FGS enhancement layer. This is useful when the decoding device is of limited or variant bandwidth and for storage purposes.

In some cases, the base layer alone is decoded, allowing for a less-detailed video image to be viewed. When the bandwidth between encoding and decoding is variant, or when the space for bitstream storage is limited, the base layer is decoded and as much of the FGS enhancement layer can be added on top of the base layer as bandwidth or storage space allows.

The MPEG-4 standard operates by first encoding a base layer of the scene being compressed. This base layer is a lower-quality, low-bandwidth, compressed image. The base layer is represented by a plurality of coding blocks, e.g., the discrete cosine transform-encoded ("DCT") blocks. The FGS enhancement layer is represented by a plurality of residual blocks. Next, the FGS enhancement layer generates a bitstream in addition to the base layer bitstream. Depending on the bandwidth of the transmission channel and complexity of the decoder, a truncated bitstream of the FGS layer will necessarily be decoded.

In the MPEG-4 coding standard, two quality improvement methods are standardized for FGS enhancement layer encoding. These two methods are frequency weighting and selective enhancement. Herein, only the frequency weighting method is addressed.

The FGS enhancement layer is used to code the quantization residuals from the base layer, therefore the overall quality of the coded sequence is the.combination of the base layer information and the transmitted FGS enhancement layer information. In theory, the FGS method codes the residuals of the base layer without loss. However, it is often the case that only part of the FGS enhancement layer can go through the transmission channel and arrive at the decoder, due to a limited transmission bandwidth. When bandwidth variation occurs, the number of bits of the FGS enhancement layer transmitted from the encoder side to the decoder side are variant depending on the bandwidth at the moment of transmittal. Also, due to the nature of FGS enhancement layer coding, it can be placed in storage to any desired quality level. Hence, the visual quality of the transmitted/stored signal is heavily impacted by the amount of the FGS layer that is decoded.

To improve the visual quality of the output sequence, frequency weighting allows the weighting of the elements of the residual block unevenly before the bitplane coding (which is the method used for the FGS layer coding). Since certain frequency components are visually more important, they should be enhanced more (i.e. they should be coded with high accuracy by being given high frequency weights), thereby improving the subjective image quality.

Bit-Plane Shift

Objects being encoded by bit-plane encoding are ordered from most-significant bit ("MSB") to least significant bit ("LSB"). A Bit-plane shift describes the operation of shifting the bitplanes corresponding to a particular value in a block by one or more bits towards the MSB. This has the effect of increasing, or boosting, the priority of the objects encoded, in this case the residual block.

Quantization Residuals

When the base-layer coefficients are encoded or "quantized, " the quantization function has an associated loss. Thus, the accuracy of the quantized data depends on the quantization steps. Quantization residuals are left out as a non-encoded part for the base-layer and not recoverable at the base layer of the decoder side.

Fine Granularity

Fine granularity refers to a coding method where the video data is encoded in a progressive way (bit-plane by bit-plane), from MSB to LSB. Consequently the encoded bitstream can be truncated at any bit-plane level, while always ensuring the more significant data is more likely to be sent.

Frequency weighting ("FW") uses a FW matrix to selectively re-weight the importance of each enhancement layer coefficient within each coding block, so that the significance of each coefficient for bitplane encoding is re-prioritized by the weighting matrix. Each element of the FW matrix indicates the number of bit-plane shifts of the corresponding FGS coefficient within the block. A bit-plane shift of one is equivalent to the multiplication of the FGS coefficient by a power of two. While MPEG-4 does standardize the FGS tool, it does not provide an appropriate FW matrix. The FW matrix definition is left as an encoder optimization parameter to be set by each manufacturer individually.

Using a DCT based codec as an example, for an 8×8 DCT block, the DC coefficient and the lower frequency components usually contribute more to the visual quality. Thus, the lower frequency components and the DC coefficient should be encoded with high priority. However, the FGS codec is designed in such a way that the enhancement layer encodes the residuals bitplane by bitplane with regards to the amplitude of the residual only, rather than the importance of the frequency components. On the other hand, the base layer coding which codes the DC and lower-frequency components with a higher accuracy by using smaller quantization parameters will result in smaller residuals for the enhancement layer. Consequently, in contrast to the base, layer DCT coefficients characteristics, the important DC and lower frequency components may have smaller values in the enhancement layer, and will not be encoded by FGS in a more significant bitplane. When the targeted number of transmitted bitplane is low, the important frequency components may be lost due to bitstream truncation. To prevent this, the more important coefficients should be encoded in a higher bitplane with higher priority. This can be achieved through giving higher weights at that frequency location in the FW matrix. The FW matrix is designed to lift up the more important frequency components to a higher bitplane.

One problem with current FW implementations is that the FW method is conducted in such a way that the whole sequence uses the same weighting matrix. As observed from tested sequences, each sequence may have multiple scenes, which may contain different motion activities and brightness information. In slow motion or tranquil scenes, high frequency loss becomes more annoying. Moreover, blockiness and flickering noise are more annoying on brighter pictures. Pictures with more motion activities tend to have bigger residuals in the enhancement layer, especially for the higher frequency part. This is because of motion prediction errors. For a picture containing more detailed information, high frequency residuals are too significant to be ignored.

SUMMARY OF THE INVENTION

The present invention provides methods of and systems for addressing the needs of the prior art. These methods and systems provide the ability to determine the FW matrix that will provide the best image quality during encoding, and to adapt the weighting matrix to regard a change of the scene characteristics, thereby optimizing the resulting output picture quality, especially in bandwidth-deprived applications.

To address the problem of using a single fixed FW matrix for each sequence in the prior art, the FW matrix is designed to be changed during encoding in accordance with the change of scene characteristics as explained below.

The present invention, which addresses the needs of the prior art, provides in an embodiment, a method of processing a video stream containing one or more of video frames, in which the video stream is encoded by creating a base layer for each frame, including a plurality of encoded blocks, and adding an enhanced layer, where the quantization residuals of the base layer forms a residual block to be further encoded to increase the fine granularity.

In this method a plurality of frequency weighting matrix are defined, each of which specifies the number of bit-plane shifts to apply to the coefficients of the residual blocks, in which one or more of the matrix specifies a high weight and high width. Weight is related to the number of bitplane shifts, while width is a range from the top left corner of the frequency weighting matrix to the last non-zero weights of the frequency weighting matrix along a zigzag line. An additional one or more said matrix specifies a higher weight and medium width, one or more said matrix specifies low weight and low width, one or more said matrix specifies medium weight and high width, and one or more matrix specifies medium weight and medium width weights.

Next, the base layer and enhancement layer of the video frame are encoded. The enhancement layer is represented by a plurality of encoded residual blocks. The encoded residual blocks are frequency-weighted with the chosen frequency weighting matrix.

If the video frame contains a high amount of activity, a high weight and high width frequency weighting matrix (HH), an example of which is depicted in FIG. 3a, is chosen to be the frequency matrix used for bit-plane shifting.

Otherwise, if the video frame contains a high amount of motion, a high weight and medium width frequency weighting matrix (HM), an example of which is depicted in FIG. 3b, is chosen to be the frequency matrix used for bit-plane shifting.

Otherwise, if the video frame contains a low amount of motion and low amount of activity, allow weight, low width frequency weighting matrix (LL), an example of which is depicted in FIG. 3e, is chosen to be the frequency matrix used for bit-plane shifting.

Otherwise, if the video frame contains a low amount of brightness, a medium weight, high width frequency weighting matrix (MH), an example of which is depicted in FIG. 3c, is chosen to be the frequency matrix used for bit-plane shifting.

Otherwise, the medium height and medium width matrix (MM), an example of which is depicted in FIG. 3d, is used to determine the bit-plane shift to be applied to the blocks of the video frame.

The invention also relates to a system for processing a video stream, in which the video stream contains a plurality of video frames. This system includes a video signal source of the video stream, a processor operatively coupled to the video signal source, and an output for encoded video.

The processor is configured to define a plurality of frequency weighting matrix, each of which specifies the number of bit-plane shifts to apply to the coefficients of the residual blocks, in which one or more of the matrix specifies a high weight and high width, and one or more said matrix specifies a higher weight and medium width, one or more said matrix specifies low weight and low width, one or more said matrix specifies medium weight and high width, and one or more matrix specifies medium weight and medium weights. Next, the base layer and enhancement layer of the video frame are encoded. The residual encoded blocks of the enhancement layer are frequency-weighted with the frequency weighting matrix. If the vide frame contains a high amount of activity, a high weight and high width frequency weighting matrix is used to determine the bit-plane shift to be applied to the blocks of the video frame. Otherwise, if the video frame contains a high amount of motion, a high weight and medium width frequency weighting matrix is used to determine the bit-plane shift to be applied to the blocks of the video frame. Otherwise, if the video frame contains a low amount of motion and low amount of activity, a low weight and low width frequency weighting matrix is used to determine the bit-plane shift to be applied to the blocks of the video frame. Otherwise, if the video frame contains a low amount of brightness, a medium weight and high width frequency weighting matrix is used to determine the bit-plane shift to be applied to the blocks of the video frame. Otherwise, the medium height and medium width is used to determine the bit-plane shift to be applied to the blocks of the video frame.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE PREFERRED EMBODIMENT

The following description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

The present invention addresses the problem of using a single fixed FW matrix for each sequence in the prior art.

Figure 1:
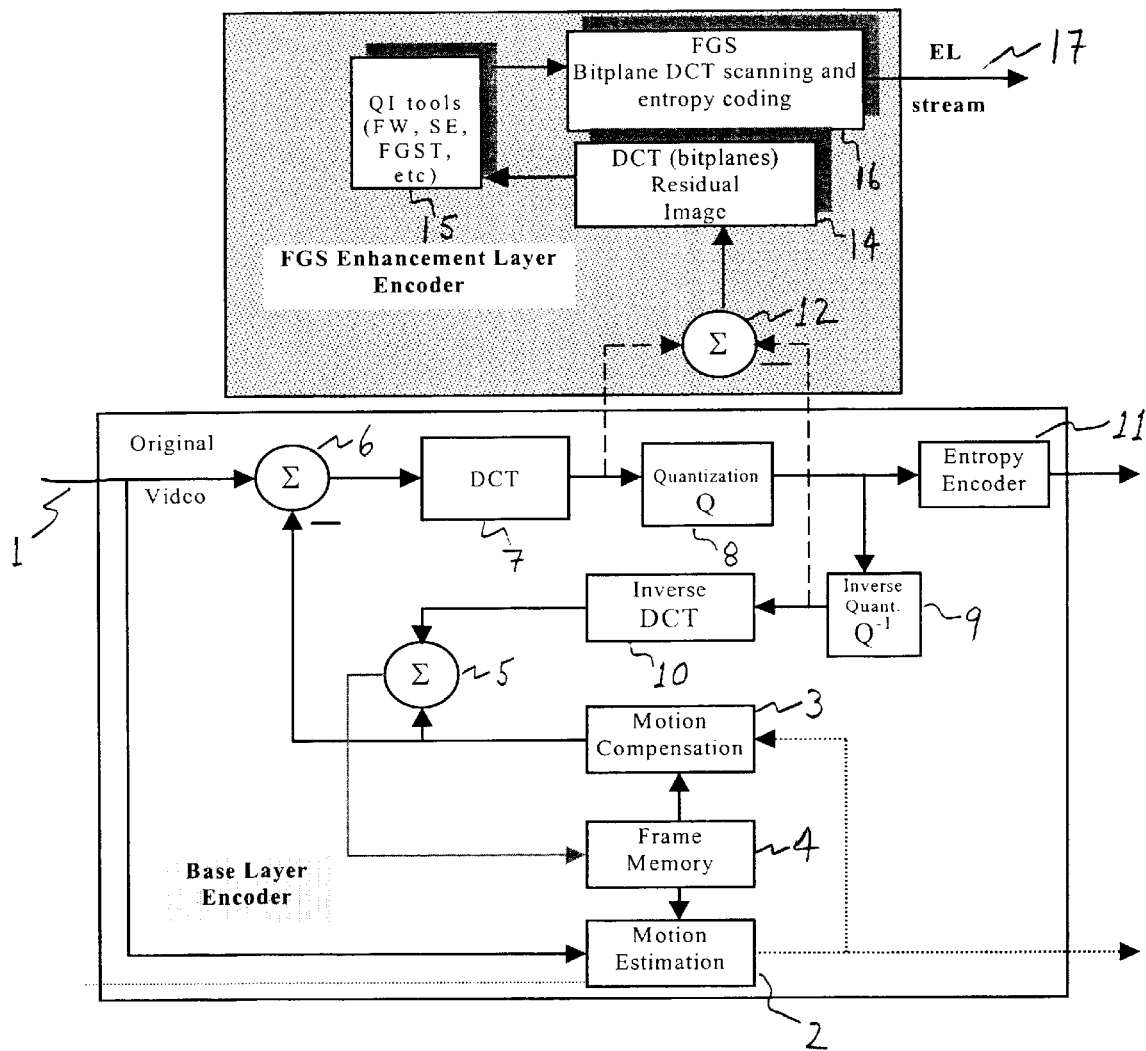
FIG. 1 is a diagram generally illustrating the process of encoding video using the MPEG-4 video encoding standard with FGS encoding.

The various steps in the encoding of a motion video according to the MPEG-4 standard is depicted in FIG. 1. A motion video input sequence 1 enters the first stage of compression, the encoding of the base layer, wherein motion estimation 2 and motion compensation 3 is performed with the help of frame memory 4, and image accumulator 5.

Image accumulator 6 applies the results of motion compensation 3 to the motion video input sequence 1. The output of the image accumulator 6 is further processed to generate discrete cosine transform blocks 7, which then undergo quantization 8. Quantization 8 output then is sent to inverse quantization 9 and then to inverse discrete cosine transform 10, and on to the image accumulator 5. Quantization 8 output is also sent to an entropy encoder 11.

Output from the base layer-encoder is tapped by the image accumulator 12 after the DCT blocks are generated 7, and from the inverse quantization step 9, to begin the process of FGS enhancement layer encoding. The image accumulator 12 sends the video signal to DCT residual image processing 14. The output from this processes are sent on for frequency weighting 15 of the bitplanes, FGS bitplane DCT scanning and entropy coding 16, and finally an encoded bitstream emerges 17.

Figure 2:
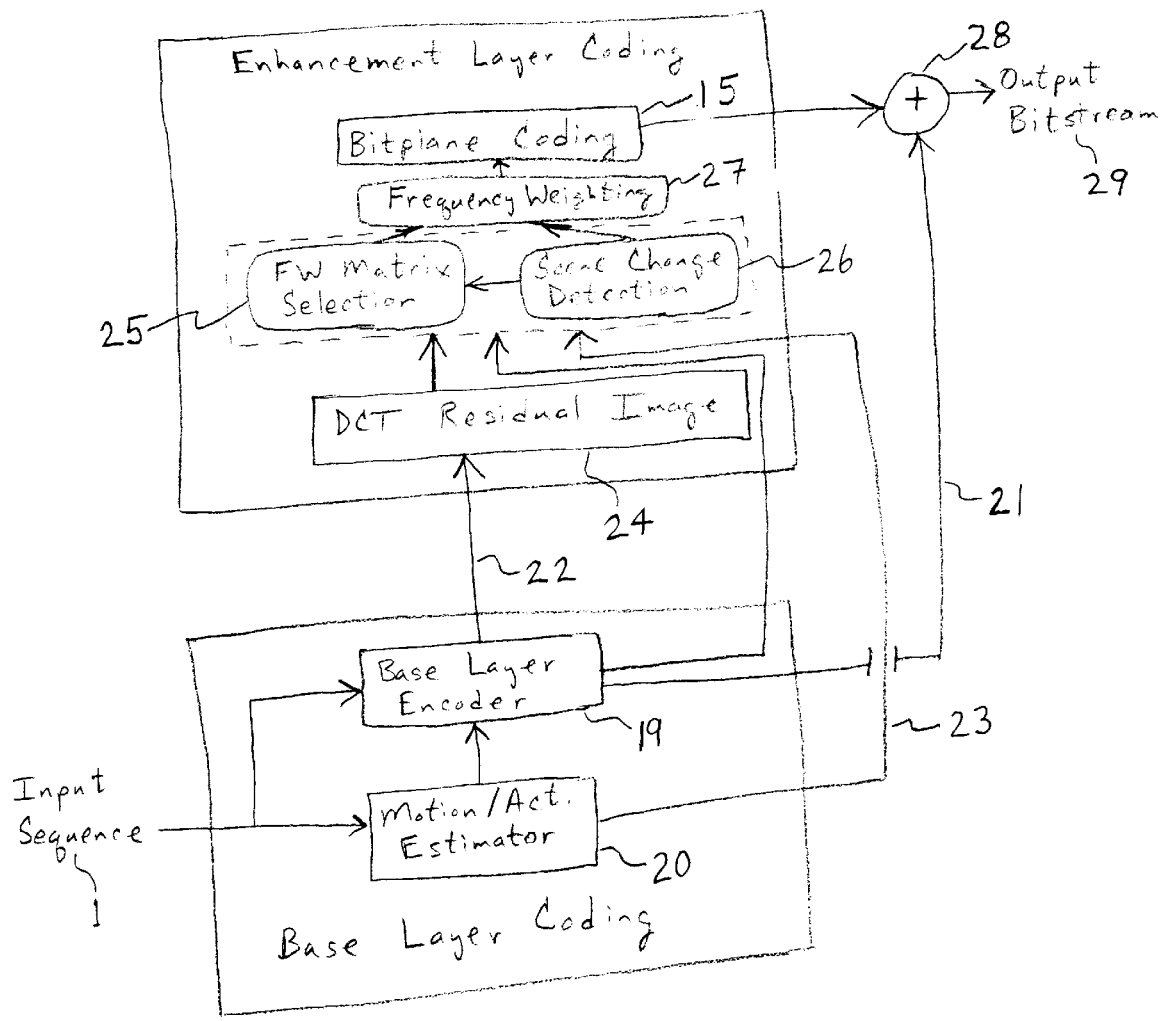
FIG. 2 is a diagram further illustrating component steps in the process of encoding MPEG-4 video with an embodiment of the invention.

A view of the various steps in the encoding of a motion video according to the MPEG-4 standard, with less emphasis on the base layer coding, and with the current invention, is depicted in FIG. 2. A motion video input sequence 1 enters the first stage of compression, the encoding of the base layer 19. The input sequence 1 is also routed to a motion estimator 20, where motion vectors are calculated. The output of the base layer encoding 19 is passed 21 to an image accumulator 11 and also passed for enhancement layer coding 22. DCT residual images are generated 24, and sent together with the output of the base layer encoder 19 and motion estimator 20 to FW matrix selection 25 and scene change detection 26. The result of FW matrix selection 25 and scene change detection 26 is forwarded for frequency weighting 27, then to bitplane coding 15, and finally passed on to the image accumulator 28, which composites the results as an output encoded bitstream 29.

The step of FW matrix selection 25 and 26 are objects of the present invention.

Figure 3:
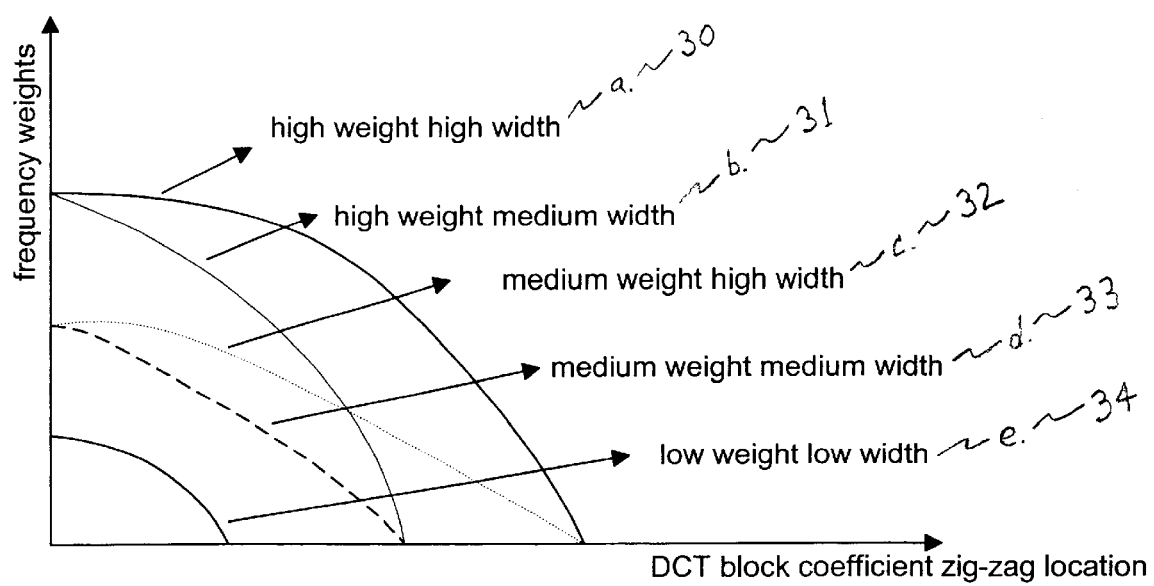
FIG. 3 is a graph illustrating various FW weighting matrices, with coordinates for weighting and DCT coefficient offset.

Referring now to FIG. 3, a graphic representation of five (5) sample FW matrix depicting relative weighting as a function of DCT coefficient offset (i.e., 0 to 63 for an 8×8 DCT block) is shown. Matrix (a) is a high weight, high width FW matrix 30, Matrix (b) is a high weight, medium width FW matrix 31, with lower-offset DCT coefficients weighted more heavily. Matrix (c) is a medium weight, high width FW matrix 32, wherein relatively more coefficients are weighted with non-zero weights. Matrix (d) is a medium weight, medium width FW matrix 33,. Matrix (e) is a low weight, low width FW matrix 34, wherein only small amount of coefficients are slightly weighted.

In one embodiment, a video sequence that has a high amount of activity, a high weight and high width FW weighting matrix, such as depicted in FIG. 3(a) 30 is employed.

In another embodiment, a video sequence that has a high amount of motion, a high weight and medium width FW matrix, such as depicted in FIG. 3(b) 31 is used.

In another embodiment, a video sequence that contains a low amount of brightness, a medium weight, high width frequency weighting matrix, such as depicted in FIG. 3(c) 32 is used.

In another embodiment, a video sequence that contains a low amount of motion and low amount of activity, a low weight and low width frequency weighting matrix, such as depicted in FIG. 3(e) 34 is used. Otherwise, the medium weight and medium width matrix, an example of which is depicted in FIG. 3(d) 33, is used to determine the bit-plane shift to be applied to the blocks of the video frame.

Thus, while we described what are the preferred embodiments of the present invention, further changes and modifications can be made by those skilled in the art without departing from the true spirit of the invention, and it is intended to include all such changes and modifications as come within the scope of the claims set forth below. For example, this method can be applied in other bitplane coding schemes, such as 3D wavelet coding.

What is claimed is:

1. A method of processing a video stream containing a plurality of video frames, in which said video stream is encoded by creating a base layer for each said frame, wherein said encoding includes a plurality of encoded blocks, and adding an enhancement layer, wherein the quantization residuals of said base layer forms a residual block to be further encoded to increase the fine granularity, said method comprising:

defining a plurality of frequency weighting matrix, each said matrix specifying the number of bit-plane shifts to apply to the coefficients of said residual blocks, in which one or more said matrix specifies a high weight and high width, and one or more said matrix specifies a high weight and medium width, one or more said matrix specifies low weight and low width, one or more said matrix specifies medium weight and high width, and one or more matrix specifies medium weight and medium width; and encoding said base layer and encoding said enhancement layer, in which said enhancement layer is represented by a plurality of encoded residual blocks, wherein said encoded residual blocks are frequency-weighted with said frequency weighting matrix; and when said video frame contains a high amount of motion, using said high weight and medium width frequency weighting matrix to determine said bit-plane shift to be applied to said blocks of said video frame; or when said video frame contains a high amount of activity, using said high weight and high width frequency weighting matrix to-determine said bit-plane shift to be applied to said blocks of said video frame; or when said video frame contains a low amount of motion and low amount of activity, using said low weight and low width frequency weighting matrix to determine said bit-plane shift to be applied to said blocks of said video frame; or when said video frame contains a lower amount of brightness, using said medium weight and high width frequency weighting matrix to determine said bit-plane shift to be applied to said blocks of said video frame; or otherwise, using said medium weight and medium width frequency weighting matrix to determine said bit-plane shift to be applied to said blocks of said video frame.

2. The method of claim 1, wherein said video stream is compressed using the MPEG-4 video compression standard.

3. The method of claim 1, wherein said enhancement layer of said encoded video stream is the fine granularity scalability enhancement layer coding of MPEG-4.

4. A system for processing a video stream, in which said video stream contains a plurality of video frames, in which said video stream is encoded by creating a base layer of each said video frame, and adding an enhancement layer, wherein the quantization residuals of said base layer forms a residual block to be further encoded to increase the fine granularity, and said processing includes a plurality of discrete cosine transform ("DCT") encoded blocks, said system comprising:

a video signal source of said video stream; and a processor operatively coupled to said video signal source, and an output for encoded video, said processor configured to:

define a plurality of frequency weighting matrix, each said matrix specifying the number of bit-plane shifts to apply to the coefficients of said residual blocks, in which one or more said matrix specifies a high weight and high width, and one or more said matrix specifies a high weight and medium width, one or more said matrix specifies low weight and low width, one or more said matrix specifies medium weight and high width, and one or more matrix specifies medium weight and medium width; and encode said base layer and encode said enhancement layer, in which said enhancement layer is represented by a plurality of residual encoded blocks, wherein said residual encoded blocks are frequency-weighted with said frequency weighting matrix; and when said video frame contains a high amount of motion, use said high weight and medium width frequency weighting matrix to determine said bit-plane shift to be applied to said blocks of said video frame; or when said video frame contains a high amount of activity, use said high weight and high width frequency weighting matrix to determine said bit-plane shift to be applied to said blocks of said video frame; or when said video frame contains a low amount of motion and low amount of activity, use said low weight and low width frequency weighting matrix to determine said bit-plane shift to be applied to said blocks of said video frame; or when said video frame contains a low amount of brightness, use said medium weight and high width frequency weighting matrix to determine said bit-plane shift to be applied to said blocks of said video frame; or otherwise, use said medium weight and medium width frequency weighting matrix to determine said bit-plane shift to be applied to said blocks of said video frame; and place encoded enhancement layer video stream onto said encoded base layer to form a video output.

5. The system of claim 4, wherein said video stream is compressed using the MPEG-4 video compression standard.

6. The system of claim 4, wherein said enhancement layer of said encoded video stream is the fine granularity scalability enhancement layer coding of MPEG-4.

* * * * *